(No Model.)
E. HUBER.
T-BOLT.
No. 438,161. Patented Oct. 14, 1890.
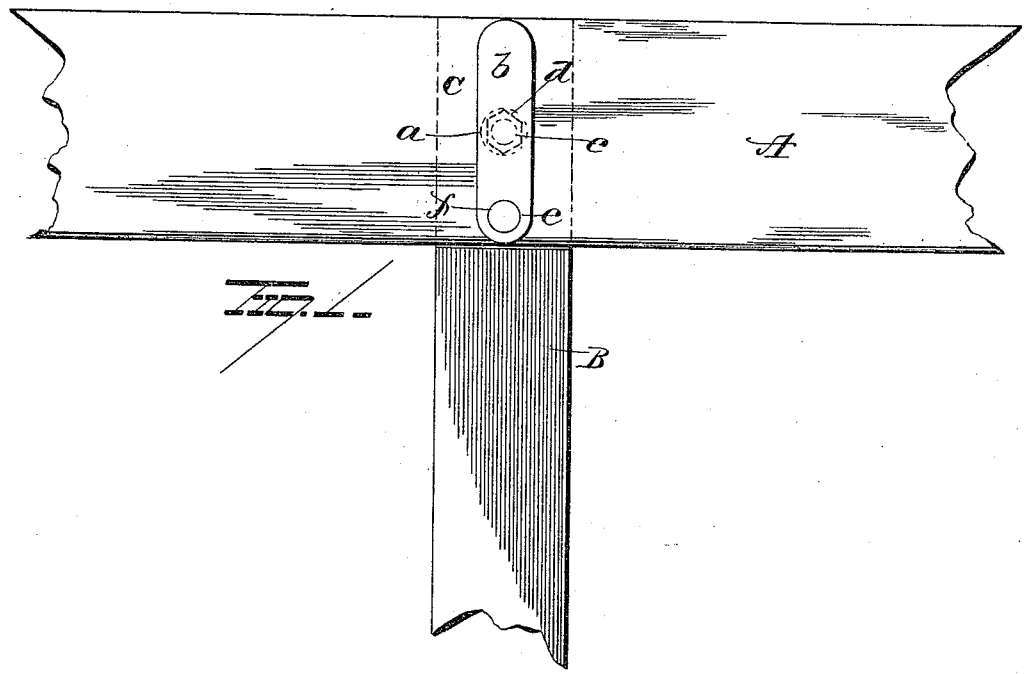
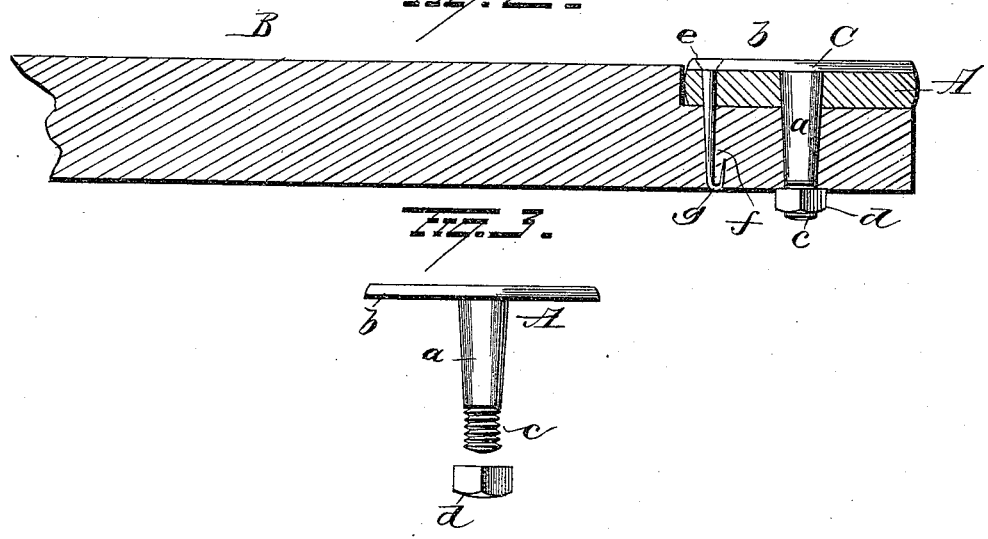
Witnesses
E. J. Mughan
G. F. Downing
Inventor
Edward Huber
By his Attorneys
Seggett & Seggett

UNITED STATES PATENT OFFICE.

EDWARD HUBER, OF MARION, OHIO.

T-BOLT.

SPECIFICATION forming part of Letters Patent No. 438,161, dated October 14, 1890.

Application filed August 1, 1890. Serial No. 360,834. (No model.)

*To all whom it may concern:*

Be it known that I, EDWARD HUBER, a citizen of Marion, in the county of Marion and State of Ohio, have invented certain new and useful Improvements in T-Bolts; and I do hereby declare the following to be a full, clear, and exact description of the invention, such as will enable others skilled in the art to which it appertains to make and use the same.

My invention relates to an improvement in bolts, and more particularly to such as are adapted for use in securing cross bars or slats to the straps of an endless conveyer, the object of the invention being to so construct a bolt for the purpose stated that the slats of an endless conveyer may be secured to the straps thereof in such manner that the positions of said parts relatively to each other shall be maintained the same, and thus keep the entire web of the conveyer in proper working position.

A further object is to so construct a bolt that the parts to be held thereby shall be prevented from lateral as well as pivotal movement.

With these objects in view the invention consists in certain novel features of construction and combinations and arrangements of parts, as hereinafter set forth, and pointed out in the claims.

In the accompanying drawings, Figure 1 is a portion of a conveyer, showing the application of my improved bolt thereto. Fig. 2 is a sectional view through one of the slats, belt, and bolt. Fig. 3 is a detached view of the bolt.

I have illustrated my invention in connection with a conveyer; but it is evident that the bolt is equally as applicable in other connections.

A represents the straps, and B the cross bars or slats constituting the web of an endless conveyer. At the points where the slats B cross the straps A said parts are provided with aligned perforations for the reception of the shank $a$ of the bolt C, which passes through them, as shown in Fig. 2. At one end the shank $a$ is provided with a cross-head $b$, thus producing a T-bolt, which cross-head preferably rests upon the strap A. At its free end the shank $a$ is preferably provided with screw-threads $c$ for the reception of a similarly-threaded nut $d$, whereby the strap and slat are securely connected together. At or near one or both ends of the cross-head $c$ a perforation $e$ is made for the reception of a pin (or pins) $f$, which is driven through the belt and slat, and at its free end said pin is preferably upset or bent upwardly to form a hook $g$, as shown in Fig. 2. By this means two devices or parts of devices may be secured together in such manner that retrograde, lateral, or pivotal movement of the parts will be effectually prevented, and when the device is used for securing the slats of an endless conveyer to the straps thereof the whole web of the conveyer will be maintained to proper working position and the parts prevented from turning and twisting, and thus affecting the proper working of the apparatus.

Having fully described my invention, what I claim as new, and desire to secure by Letters Patent, is—

1. A T-bolt having a perforation in its head and a pin adapted to pass through said perforation and extend therefrom parallel with the shank of the bolt, substantially as set forth.

2. A T-bolt having a screw-threaded shank to receive a nut and a perforation, and a pin passing through said perforated head and adapted to lie parallel with the shank of the bolt, substantially as set forth.

3. In a conveyer, the combination, with the straps and slats thereof, of a T-bolt connecting said parts, and a pin passing through the head of said bolt and through the strap and slat, substantially as set forth.

In testimony whereof I have signed this specification in the presence of two subscribing witnesses.

EDWARD HUBER.

Witnesses:
JOHN J. CRAWLEY,
JO. E. GAITES.